United States Patent
Byun et al.

(10) Patent No.: US 12,493,188 B1
(45) Date of Patent: Dec. 9, 2025

(54) VISION CORRECTION NEAR-EYE DISPLAY SYSTEM AND OPERATING METHOD OF NEAR-EYE DISPLAY

(71) Applicant: ELECTRONICS AND TELECOMMUNICATIONS RESEARCH INSTITUTE, Daejeon (KR)

(72) Inventors: Chunwon Byun, Daejeon (KR); Wooseup Youm, Daejeon (KR); Chan-mo Kang, Daejeon (KR); Dae Hyun Ahn, Daejeon (KR); Jae-Hyeung Park, Daejeon (KR); Woongseob Han, Daejeon (KR); Jiyun Han, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 0 days.

(21) Appl. No.: 19/092,273

(22) Filed: Mar. 27, 2025

(30) Foreign Application Priority Data

Aug. 13, 2024 (KR) ........................ 10-2024-0108252

(51) Int. Cl.
*G02B 27/01* (2006.01)
*G02B 5/124* (2006.01)
*G02B 26/02* (2006.01)
*G02B 27/00* (2006.01)

(52) U.S. Cl.
CPC ......... *G02B 27/0172* (2013.01); *G02B 5/124* (2013.01); *G02B 26/02* (2013.01); *G02B 27/0075* (2013.01); *G02B 27/0093* (2013.01); *G02B 2027/0127* (2013.01)

(58) Field of Classification Search
CPC .... G02B 27/0172; G02B 5/124; G02B 26/02; G02B 27/0075; G02B 27/0093; G02B 2027/0127

See application file for complete search history.

(56) References Cited

U.S. PATENT DOCUMENTS

| 10,754,156 B2 * | 8/2020 | Harrison ............ G02B 27/0172 |
| 2002/0051118 A1 * | 5/2002 | Takagi ................ G02B 27/0172 348/E13.047 |
| 2008/0198459 A1 | 8/2008 | Fergason |

(Continued)

FOREIGN PATENT DOCUMENTS

| KR | 10-1965785 B1 | 4/2019 |
| KR | 10-2235646 B1 | 4/2021 |

(Continued)

*Primary Examiner* — Pegeman Karimi
(74) *Attorney, Agent, or Firm* — Rabin & Berdo, P.C.

(57) ABSTRACT

A near-eye display system may comprise: a display panel; a pixelated optical shutter disposed to be spaced apart from a front surface of the display panel by a predetermined distance, and configured to selectively pass light from the display panel through an aperture formed therein; and a transmissive retro-reflector configured to transversely retro-reflect a portion of the light diverging after passing through the aperture of the pixelated optical shutter so that the portion of the light converges on a viewpoint of a position of a user's eye, wherein the aperture of the pixelated optical shutter and the viewpoint in which the transversely retro-reflected light converges on the position of the user's eye form a symmetry with respect to the transmissive retro-reflector.

18 Claims, 10 Drawing Sheets

(56) References Cited

U.S. PATENT DOCUMENTS

2016/0353098 A1* 12/2016 Stein ................... G02B 30/24
2023/0048195 A1  2/2023 Kim
2025/0013069 A1*  1/2025 Ota .................... G02B 30/31

FOREIGN PATENT DOCUMENTS

KR  10-2022-0107753 A  8/2022
KR  10-2489272 B1  1/2023

* cited by examiner

VISION CORRECTION NEAR-EYE DISPLAY SYSTEM AND OPERATING METHOD OF NEAR-EYE DISPLAY

CROSS-REFERENCE TO RELATED APPLICATIONS

This application claims priority to Korean Patent Applications No. 10-2024-0108252, filed on Aug. 13, 2024, with the Korean Intellectual Property Office (KIPO), the entire contents of which are hereby incorporated by reference.

BACKGROUND

1. Technical Field

The present disclosure relates to a near-eye display system and an operating method of a near-eye display, and more particularly, to a near-eye display system capable of vision correction.

2. Related Art

Virtual reality (VR) and augmented reality (AR) are considered promising concepts that enhance various aspects of life. A near-eye display (NED) may be provided as a state-of-the-art device for VR and AR. However, conventional near-eye display systems do not meet the user's requirements and do not provide visual comfort.

An optical system of a conventional commercialized near-eye display consists of a display panel and a convex lens. The optical system is configured to provide a virtual image of the display to a user by positioning a distance between the display panel and the convex lens smaller than a focal length of the convex lens. The display panel may include conventional panels such as a liquid crystal display (LCD) panel, an organic light-emitting diode (OLED) panel, a liquid crystal on silicon (LCoS) panel, and an organic light-emitting diode on silicon (OLEDoS) panel. The convex lens includes components ranging from a passive convex lens with a fixed focal length to an active convex lens capable of changing a focal length.

According to the related art, there is a problem in that users with visual impairments cannot properly focus on images, resulting in an inability to view clear images, and in order to provide clear images, optical lenses customized to a user's vision must be individually added to the optical system of the near-eye display.

SUMMARY

The present disclosure is directed to providing a near-eye display system and an operating method of a near-eye display.

The present disclosure is also directed to providing a vision correction near-eye display system capable of providing clear images with a wide field of view (FoV) regardless of a user's vision, without requiring customized lenses or image production for users with low vision.

The present disclosure is also directed to providing a near-eye display system capable of expanding an eye-box that is limited by a micro-aperture.

The present disclosure is also directed to providing a near-eye display system capable of alleviating a trade-off between image quality and a depth of field (DoF) according to an aperture size.

According to exemplary embodiments of the present disclosure, a near-eye display system may comprise: a display panel; a pixelated optical shutter disposed to be spaced apart from a front surface of the display panel by a predetermined distance, and configured to selectively pass light from the display panel through an aperture formed therein; and a transmissive retro-reflector configured to transversely retro-reflect a portion of the light diverging after passing through the aperture of the pixelated optical shutter so that the portion of the light converges on a viewpoint of a position of a user's eye, wherein the aperture of the pixelated optical shutter and the viewpoint in which the transversely retro-reflected light converges on the position of the user's eye form a symmetry with respect to the transmissive retro-reflector.

The aperture of the pixelated optical shutter may be a micro-aperture, the pixelated optical shutter may open or close the aperture for each pixel to block or pass light for each pixel, and a size and a shape of the aperture may be predetermined based on a depth of field (DoF) of the near-eye display system.

The near-eye display system may further comprise a collimation lens disposed between the display panel and the pixelated optical shutter and configured to collimate light emitted from each pixel of the display panel.

The near-eye display system may further comprise an eye tracker disposed on one of both sides of the transmissive retro-reflector, which is positioned on an opposite side of the user's eye and configured to track the position of the user's eye.

The near-eye display system may further comprise a processor, wherein the processor may adjust a position of the aperture of the pixelated optical shutter based on the position of the user's eye tracked by the eye tracker.

The near-eye display system may further comprising a processor, wherein the pixelated optical shutter may include a plurality of apertures that are opened and closed for each pixel, and the processor may select one of the plurality of apertures based on the position of the user's eye tracked by the eye tracker and control the pixelated optical shutter so that light passing through the selected aperture is incident on the transmissive retro-reflector.

The pixelated optical shutter may include a plurality of apertures that are opened and closed for each pixel, and when the position of the user's eye moves, light passing through one of the plurality of apertures may be transversely retro-reflected by the transmissive retro-reflector and converges on a new position of the user's eye to form a new viewpoint.

Two adjacent apertures among the plurality of apertures in the pixelated optical shutter may be spaced apart based on a size of a user's pupil, and as the user's eye moves, the light transversely retro-reflected by the transmissive retro-reflector continuously may converge on the user's eye to provide a visual corresponding to the display panel.

The transmissive retro-reflector may include at least one mirror array aligned perpendicular to a first direction.

The transmissive retro-reflector may include mirrors arranged such that incident light is diagonally orthogonal.

A distance between the display panel and the pixelated optical shutter may be determined based on a size of the display panel and a predetermined field of view (FoV).

The pixelated optical shutter may include at least one polarizer and a transmissive panel coupled to the at least one polarizer.

The transmissive retro-reflector may be one of a dihedral corner reflector array (DCRA) and a slit mirror array.

According to exemplary embodiments of the present disclosure, an operating method of a near-eye display may comprise: selectively passing light from a display panel through an aperture, which is formed in a pixelated optical shutter disposed to be spaced apart from a front surface of the display panel in the near-eye display by a predetermined distance, by the pixelated optical shutter; and transversely retro-reflecting a portion of the light that diverges after passing through the aperture of the pixelated optical shutter, by a transmissive retro-reflector disposed to be spaced apart from the pixelated optical shutter, so that the portion of the light converges on a viewpoint of a position of a user's eye, wherein in the transversely retro-reflecting, a path of the light is formed so that the aperture of the pixelated optical shutter and the viewpoint in which the transversely retro-reflected light converges on the position of the user's eye form a symmetry with respect to the transmissive retro-reflector.

The aperture of the pixelated optical shutter may be a micro-aperture, a size and a shape of the aperture may be predetermined based on a depth of field (DoF) of the near-eye display, and in the selectively passing of the light from the display panel through the aperture, which is formed in the pixelated optical shutter, by the pixelated optical shutter, the aperture may open or close for each pixel to block or pass light for each pixel.

The operating method may further comprise collimating light emitted from each pixel of the display panel using a collimation lens disposed between the display panel and the pixelated optical shutter.

The operating method may further comprise tracking the position of the user's eye by an eye tracker disposed on one of both sides of the transmissive retro-reflector, which is positioned on an opposite side of the user's eye.

The operating method may further comprise adjusting a position of the aperture of the pixelated optical shutter based on the position of the user's eye tracked by the eye tracker.

According to the present disclosure, it is possible to provide a near-eye display system and an operating method of a near-eye display.

According to the present disclosure, it is possible to provide a vision correction near-eye display system capable of providing clear images with a wide field of view (FoV), regardless of a user's vision, by using a pixelated optical shutter and a transmissive retro-reflector.

According to the present disclosure, it is possible to provide a near-eye display system capable of expanding an eye-box that is limited by a micro-aperture.

According to the present disclosure, it is possible to provide a deep depth of field (DoF) in a retinal projection method, in which an image is always observed in focus from a user's perspective, even when a focal length of a camera changes.

According to the present disclosure, it is possible to provide a near-eye display system capable of alleviating a trade-off between image quality and a DoF caused by an aperture size.

DETAILED DESCRIPTION OF THE EMBODIMENTS

Figure 1:
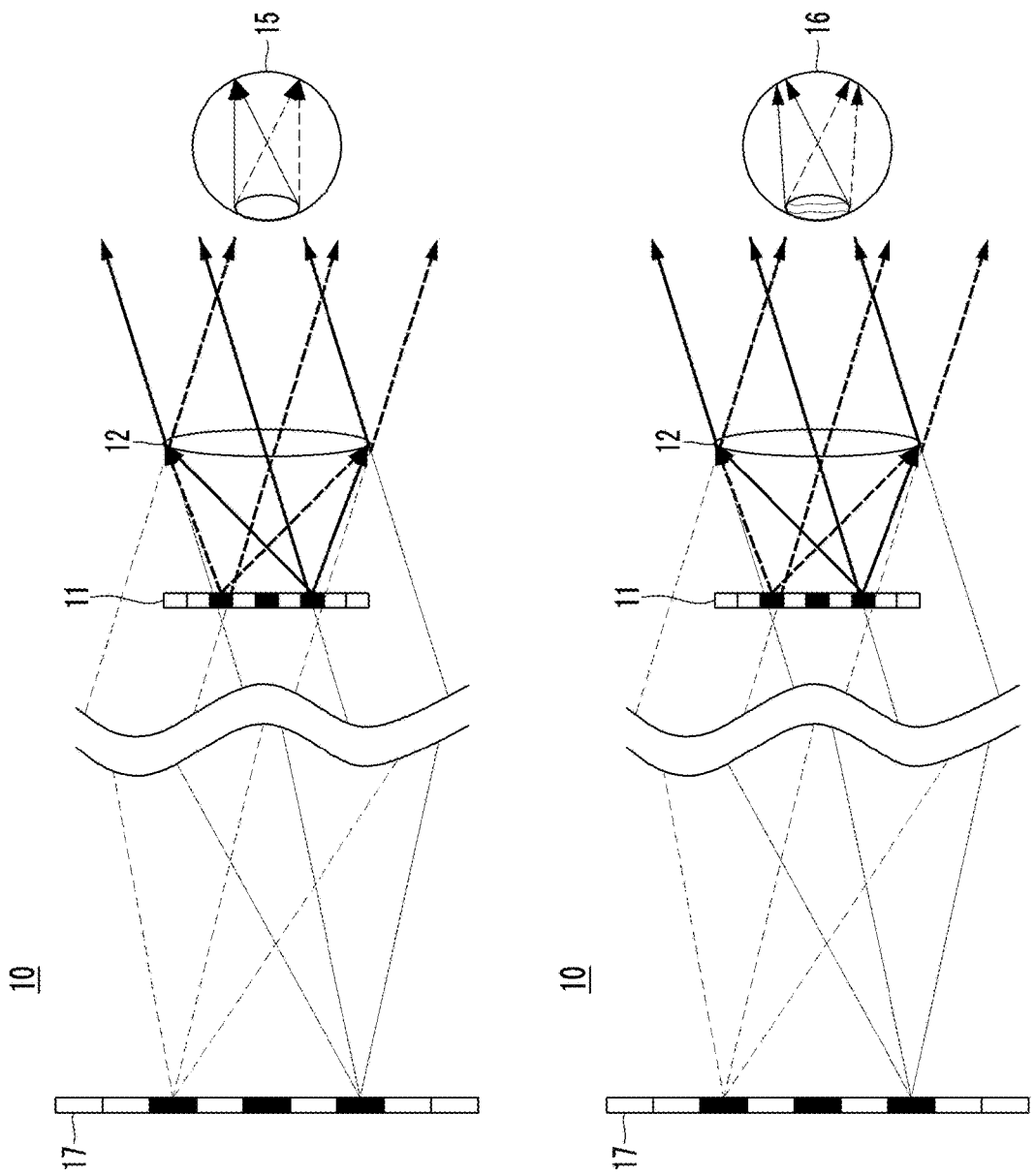
FIG. 1 is a set of diagrams for respectively describing cases in which a normal-vision user and a low-vision user use a near-eye display system according to a conventional embodiment.

While the present disclosure is capable of various modifications and alternative forms, specific embodiments thereof are shown by way of example in the drawings and will herein be described in detail. It should be understood, however, that there is no intent to limit the present disclosure to the particular forms disclosed, but on the contrary, the present disclosure is to cover all modifications, equivalents, and alternatives falling within the spirit and scope of the present disclosure. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

In exemplary embodiments of the present disclosure, "at least one of A and B" may refer to "at least one A or B" or "at least one of one or more combinations of A and B". In addition, "one or more of A and B" may refer to "one or more of A or B" or "one or more of one or more combinations of A and B".

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular embodiments only and is not intended to be limiting of the present disclosure. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this present disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, exemplary embodiments of the present disclosure will be described in greater detail with reference to the accompanying drawings. In order to facilitate general understanding in describing the present disclosure, the same components in the drawings are denoted with the same reference signs, and repeated description thereof will be omitted.

FIG. 1 is a set of diagrams for respectively describing cases in which a normal-vision user and a low-vision user use a near-eye display system according to a conventional embodiment.

A conventional near-eye display system 10 may include a display panel 11 and a convex lens 12.

The convex lens 12 may be disposed to be spaced apart from a front surface of the display panel 11, and a user's eye 15 or 16 may be positioned in front of the convex lens 12.

In the case of a user with a normal vision eye 15 (e.g., 20/20 vision), light emitted from the display panel 11 passes through the convex lens 12 and is focused on the user's retina. In this case, the user can clearly see an image on a display image plane 17.

However, in the case of a user with a low-vision eye 16, light from the display panel 11 passes through the convex lens 12 and is focused behind the user's retina, causing the user to see the image on the display image plane 17 in a blurred state.

Figure 2:
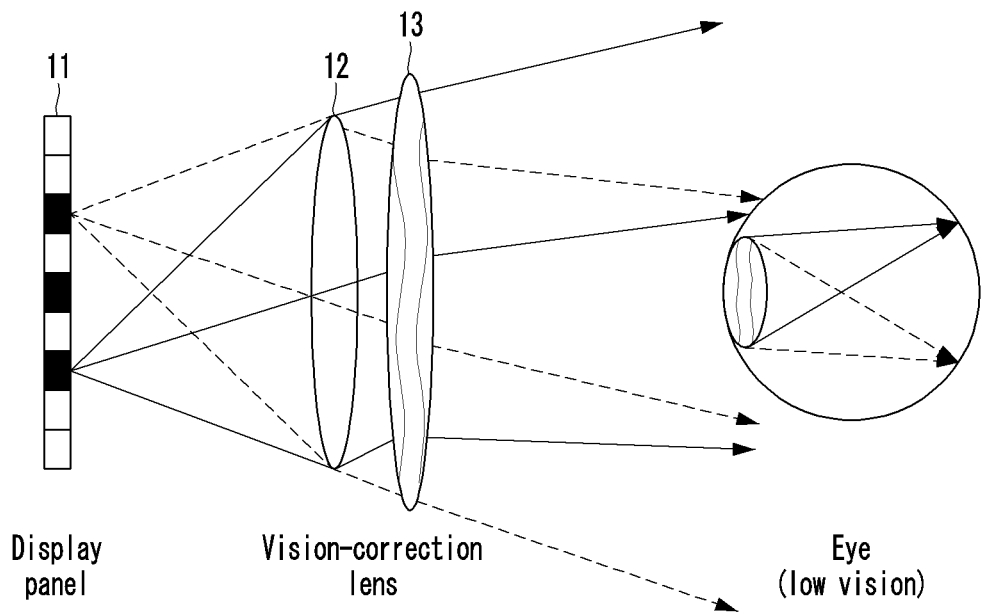
FIG. 2 illustrates a near-eye display system according to another conventional embodiment.
Figure 3:
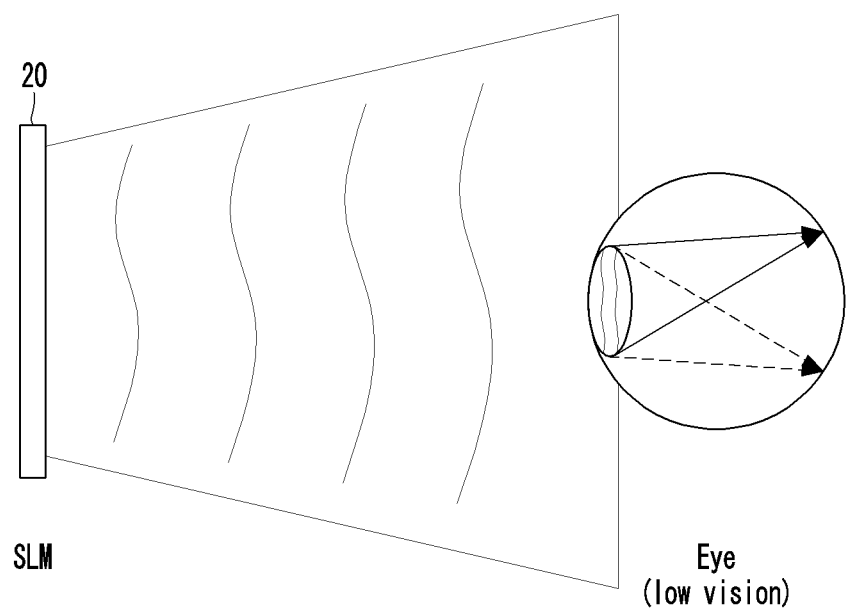
FIG. 3 illustrates a near-eye display system according to still another conventional embodiment.

In order to address these issues, near-eye display systems as shown in FIGS. 2 and 3 may be provided.

FIG. 2 illustrates a near-eye display system according to another conventional embodiment.

The embodiment of FIG. 2 is an example in which an optical lens is added to the near-eye display system of FIG. 1.

An optical lens 13 may be disposed to be spaced apart from a front surface of the convex lens 12.

Due to the near-eye display system including the optical lens 13, users with low vision can also view clear display images, similar to users with normal vision. However, in the method of the near-eye display system to which the optical lens is added, the optical lens 13 customized to each user's individual vision must be additionally introduced, which is a significantly disadvantageous limitation in terms of commercialization.

FIG. 3 illustrates a near-eye display system according to still another conventional embodiment.

In order to address the issues of the embodiment of FIG. 2, a technique has been proposed to generate corrected wavefronts customized to the user's vision by using a holographic display 20 capable of representing arbitrary wavefronts.

However, due to the manufacturing limitations of a spatial light modulator (SLM), which is the display 20 used for implementing holographic images, it is impossible to represent a wide field of view (FoV), and thus significant technological improvement is required in terms of manufacturing.

As described above, the near-eye display may cause dizziness and visual fatigue for users due to a mismatch between convergence and accommodation cues. In another conventional embodiment, the above-described issues can be alleviated by eliminating accommodation cues in a retinal projection near-eye display system. In this case, in order to eliminate the accommodation cues, the retinal projection near-eye display system reduces an exit pupil to increase a depth of field (DoF). However, when the exit pupil of the system is reduced, a problem arises in that an eye-box becomes smaller. The eye-box must remain large to ensure a comfortable wearing experience. Accordingly, the present disclosure is directed to providing a retinal projection near-eye display with a dynamic eye-box.

The present disclosure is also directed to providing a vision correction near-eye display system capable of providing clear images with a wide FoV, regardless of the user's vision.

Hereinafter, in FIGS. 4 to 9, dashed lines may represent red, dash-dotted lines may represent green, and solid lines may represent blue, indicating RGB colors.

Figure 4:
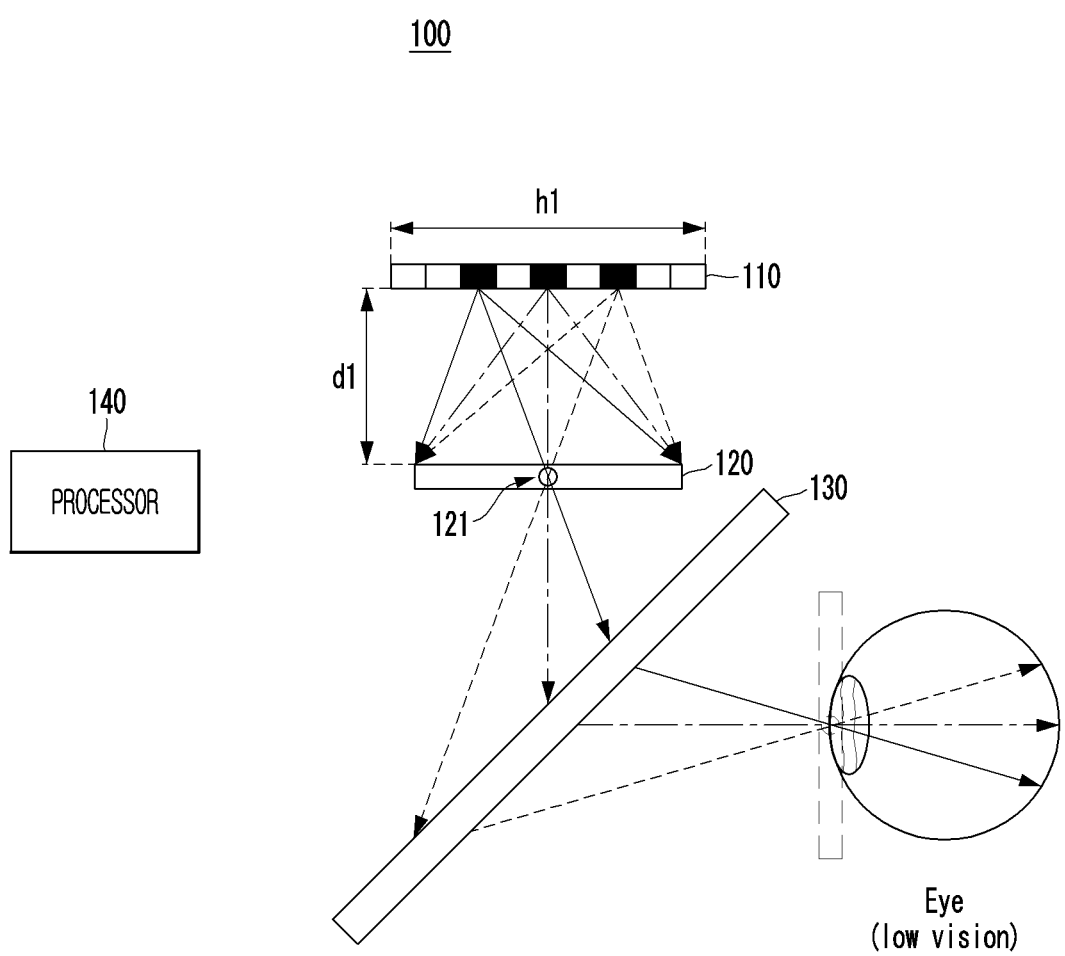
FIG. 4 illustrates a near-eye display system according to a first embodiment of the present disclosure.

FIG. 4 illustrates a near-eye display system according to a first embodiment of the present disclosure.

A near-eye display (optical) system 100 may include a display panel 110, a pixelated optical shutter 120, a transmissive retro-reflector 130, and a processor 140.

At this time, the processor 140 may control at least some of operations of the display panel 110 and/or the pixelated optical shutter 120 by loading and executing at least one command stored in a memory.

The pixelated optical shutter 120 may be disposed to be spaced apart from a front surface of the display panel 110 by a predetermined distance. An aperture (opening) 121 may be formed in the pixelated optical shutter 120. The pixelated optical shutter 120 may selectively allow light from the display panel 110 to pass through the aperture 121.

At this time, the aperture 121 of the pixelated optical shutter 120 may have a size capable of blocking or allowing light to pass on a pixel-by-pixel basis. That is, the pixelated optical shutter 120 may be represented as a micro-sized aperture and may serve to significantly reduce an effective aperture of an image represented on the display panel 110. A depth of field (DoF) of the display system 100, which has a significantly reduced effective aperture, becomes very deep, and thus, the display system 100 can always provide an image in focus regardless of changes in the observer's eye focus. This equally applies to people with low vision, such as those with myopia or hyperopia, who cannot properly focus objects on their retina, thereby enabling the people to see clear images regardless of low vision.

At this time, the pixelated optical shutter 120 may include at least one polarizer and a transmissive panel (e.g., an SLM or LCD) coupled to the at least one polarizer.

The transmissive retro-reflector 130 may perform transverse retro-reflection on some of light diverging after passing through the aperture of the pixelated optical shutter 120, so that the light converges on the user's (observer's) eye. That is, the transmissive retro-reflector 130 may be a type of retroreflector.

At this time, the transmissive retro-reflector 130, as in an embodiment to be described with reference to FIG. 10, may transmit a portion of the light incident from the display panel 110 to the opposite side of the transmissive retro-reflector 130. Meanwhile, a path of light incident on the transmissive retro-reflector 130 and a path of light transmitted to the opposite side through the transmissive retro-reflector 130 may be symmetrical with respect to the transmissive retro-reflector 130. In the present specification, the term "transverse retro-reflection" refers to a phenomenon in which, for example, a portion of light incident from the display panel 110 is transmitted through the transmissive retro-reflector 130 to the opposite side of the transmissive retro-reflector 130, and at this time, the light is physically reflected by a mirror array in the transmissive retro-reflector 130, and thus, when observed macroscopically, the incident light and the transmitted light form a symmetry with respect to the transmissive retro-reflector 130.

In the present disclosure, a configuration is provided in which light is retro-reflected in x- and y-axis directions while allowing the light to pass through in a z-axis direction. Conventional general retro-reflection involves a configuration of retro-reflecting in all of the x-, y-, and z-directions, and the present disclosure has a configuration that differentiates itself from such conventional retro-reflection. This feature of the present disclosure may be referred to as transverse retro-reflection.

The transversely retro-reflected light can converge on a viewpoint, which is a position of the user's eye. That is, the position at which the transversely retro-reflected light passes through the user's pupil plane may be referred to as the viewpoint.

The structure of the near-eye display system 100 is a structure in which a user observes an image at a convergence point of the light, and may also be a structure in which the user's eyes overlap with a real image formed by the pixelated optical shutter 120. That is, light entering through the small aperture of the pixelated optical shutter 120 is directly projected onto the retina of the eye, and thus, provides the user with a clear image focused on the retina.

At this time, a dihedral corner reflector array (DCRA), a slit mirror array, and the like may be used as the transmissive retro-reflector 130.

The aperture 121 of the pixelated optical shutter 120 may be a micro-aperture. The pixelated optical shutter 120 may allow light from all pixels of the display panel 110 to (partially) pass through. The amount of light and the DoF of the image may vary depending on the size and/or shape of the aperture.

At this time, the size and/or shape of the aperture 121 may be pre-designed/preset based on the DoF of the near-eye display system 100.

For example, the aperture 121 may have various shapes, such as a circle like a pinhole, a square shape, or a diamond shape, and the spirit of the present disclosure is not limited by these examples.

By adjusting the size of the aperture 121 of the pixelated optical shutter 120, a depth of field of the image may be expanded. The depth of field may also be influenced by the shape of the aperture 121 of the pixelated optical shutter 120. At this time, the DoF and image quality may be influenced by the size of the aperture 121, and there may be a trade-off relationship between the image quality and the DoF. For example, the aperture 121 of a small size provides a deep DoF, but depending on the DCRA structure, there is a possibility that image quality may deteriorate. The aperture 121 of a large size provides excellent image quality but offers a shallow DoF, which may also have the potential to disrupt the Maxwellian view effect.

By varying the shape of the aperture 121 while maintaining the size of the aperture 121, it is possible to reduce image deterioration caused by the DCRA structure and alleviate the trade-off relationship between the DoF and the image quality.

The near-eye display system 100 of the present disclosure can provide improved DoF and image quality based on features such as the size and shape of the aperture 121 of the pixelated optical shutter 120, as well as the structure including the transmissive retro-reflector 130 having the DCRA, and can also provide effective near-eye vision even for users with low vision.

Figure 5:
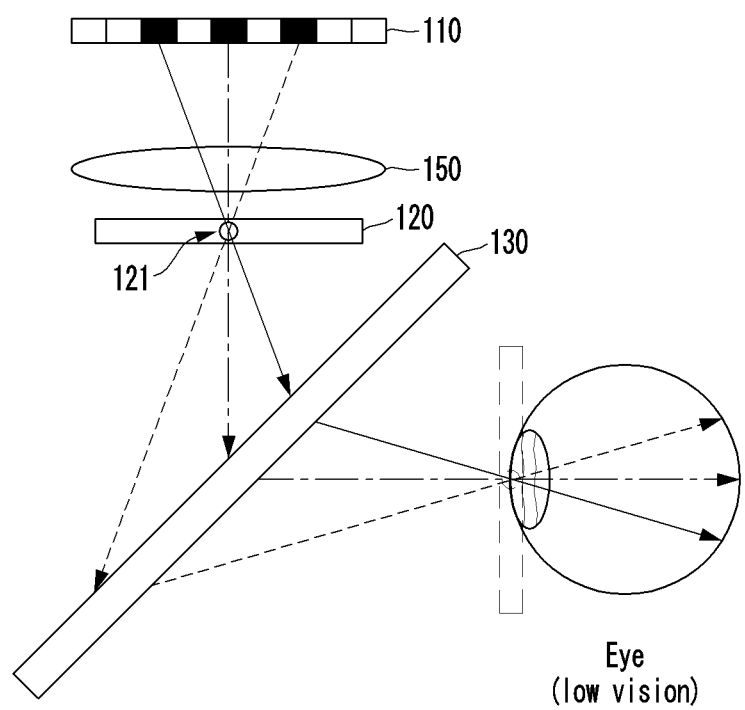
FIG. 5 illustrates a near-eye display system according to a second embodiment of the present disclosure.

FIG. 5 illustrates a near-eye display system according to a second embodiment of the present disclosure.

The second embodiment may be an example in which a collimation lens is added to the near-eye display system 100 of the first embodiment.

That is, the near-eye display system may include the display panel 110, the pixelated optical shutter 120, the transmissive retro-reflector 130, the processor 140, and a collimation lens 150.

The collimation lens 150 may be disposed between the display panel 110 and the pixelated optical shutter 120 to provide a clearer image. The collimation lens 150 may collimate light emitted from each pixel of the display panel 110 and direct the light into the aperture 121 of the pixelated optical shutter 120.

An image generated on the display panel 110 is positioned at infinity after passing through the collimation lens 150. The collimation lens 150 may collimate the light emitted from each pixel, thereby reducing the size of a region on the retina on which each pixel is focused.

For example, the display panel 110 may be an organic light-emitting diode (OLED) panel, and the collimation lens 150 may be a convex lens.

Hereinafter, an embodiment in which a FoV of an image is expanded will be described with reference to FIGS. 6 and 7.

Figure 6:
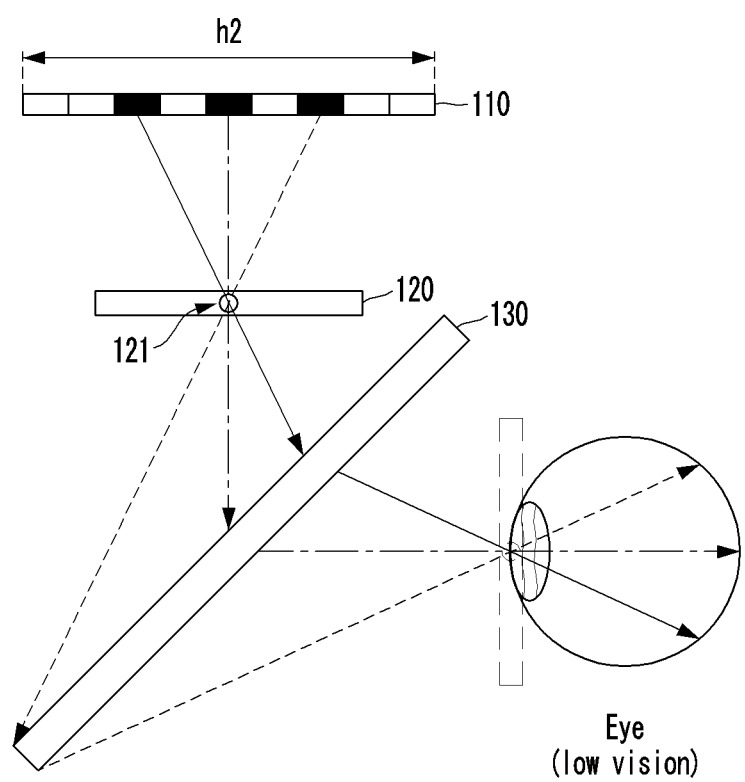
FIG. 6 illustrates a near-eye display system according to a third embodiment of the present disclosure.

FIG. 6 illustrates a near-eye display system according to a third embodiment of the present disclosure.

In the third embodiment, unlike the first embodiment, a FoV can be easily expanded by increasing the size of the display panel 110 (h1<h2).

Even when the size of the display panel 110 is increased, a divergence angle of light emitted from the commercialized panel may be very large, which allows the light to be captured inside the micro-aperture 121 represented by the pixelated optical shutter 120. In the present disclosure, since a real image of the pixelated optical shutter 120 overlaps with the user's pupil, the user may observe the entire image captured within the micro-aperture 121.

Figure 7:
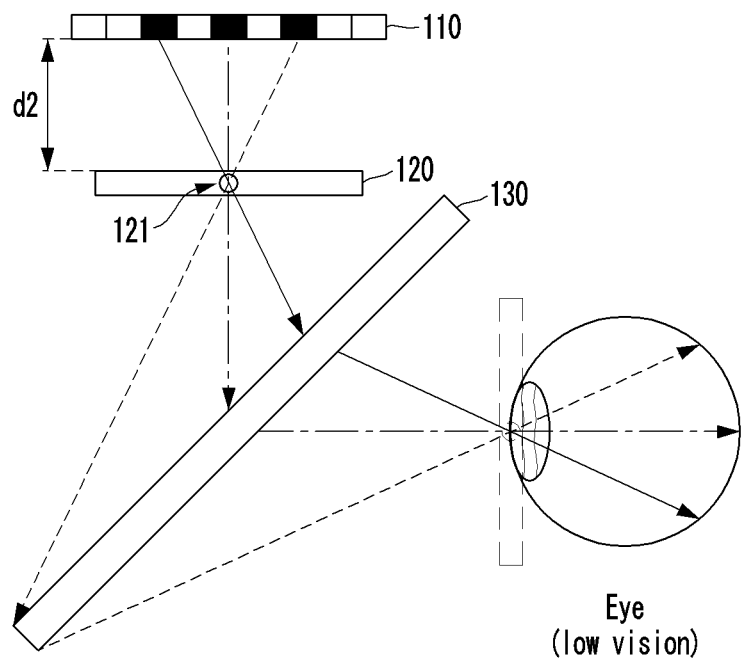
FIG. 7 illustrates a near-eye display system according to a fourth embodiment of the present disclosure.

FIG. 7 illustrates a near-eye display system according to a fourth embodiment of the present disclosure.

The fourth embodiment illustrates a case in which a distance between the display panel 110 and the pixelated optical shutter 120 is reduced (d1>d2), unlike the first embodiment.

The processor 140 may adjust the distance between the display panel 110 and the pixelated optical shutter 120 according to a certain FoV (predetermined by a user). The near-eye display system may further include a driving apparatus for adjusting the distance. The driving apparatus may be connected to the processor.

By reducing the distance between the display panel 110 and the pixelated optical shutter 120, an angle at which light emitted from outer edges of the display panel enters the aperture 121 of the pixelated optical shutter 120 can be increased.

Through the third and/or fourth embodiments, the small FoV, which is the biggest issue of near-eye displays using micro-display panels such as liquid crystal on silicon (LCoS)/organic light-emitting diode on silicon (OLEDoS)/light-emitting diode on silicon (LEDoS), can be overcome.

Meanwhile, in another embodiment, the processor 140 may adjust the distance between the display panel 110 and the pixelated optical shutter 120 to a distance value corresponding to an FoV desired by the user, based on the size of the display panel 110. For example, as the size of the display panel 110 increases, the processor 140 can receive the FoV desired by the user and adjust the distance accordingly.

Referring to the embodiments described with reference to FIGS. 6 and 7 together, the near-eye display system may determine the distance between the display panel 110 and the pixelated optical shutter 120 based on the size of the display panel 110 and/or the predetermined field of view (FoV). Accordingly, the size of the display panel 110 and/or the distance between the display panel 110 and the pixelated optical shutter 120 may be determined based on the target predetermined field of view (FoV), and the near-eye display system may be designed accordingly.

Figure 8:
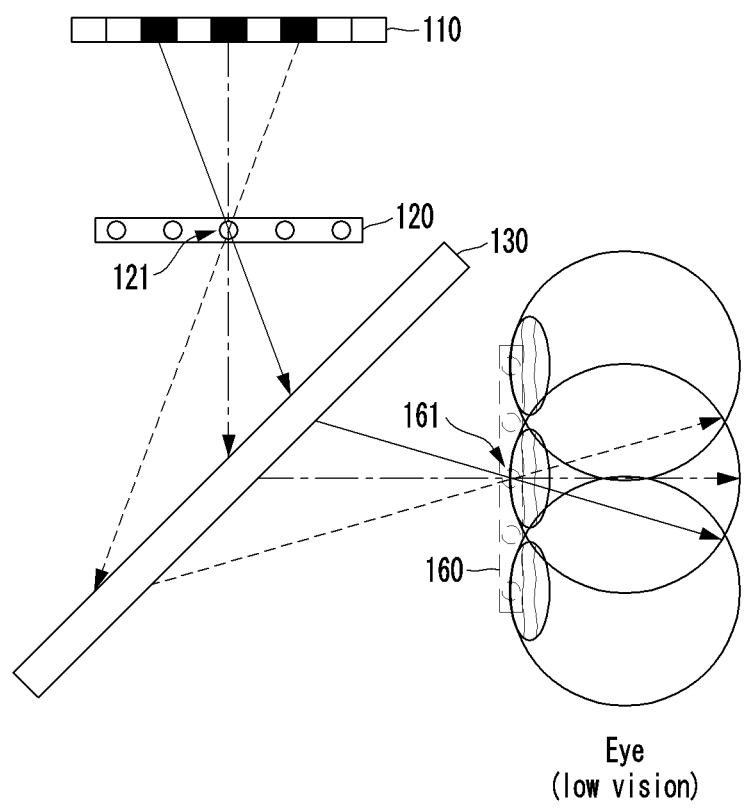
FIG. 8 illustrates a near-eye display system according to a fifth embodiment of the present disclosure.

FIG. 8 illustrates a near-eye display system according to a fifth embodiment of the present disclosure.

In a typical example, the effective aperture 121 of the display system, which is significantly restricted by the pixelated optical shutter 120, may fail to provide a valid visual experience when the user's actual eye position deviates even slightly. In a typical example, this issue results in a very small eye-box, making even slight eye movements cause a portion or the entirety of the image to become unobservable. In addition, due to differences in interpupillary distance between individual users, the predefined positions of the micro-openings (apertures) may be inappropriate for certain users, and as a result, the image may not be observed.

To address this issue, two alternatives can be proposed. In a near-eye display, a first proposal for providing valid vision across a wide range of eye movement positions, that is, for expanding an eye-box, involves implementing an embodiment in which a plurality of apertures 121 are formed in the pixelated optical shutter 120, as shown in FIG. 8, to expand the eye-box. For example, the near-eye display system of the fifth embodiment of the present disclosure may include a plurality of viewpoints 160 and 161. At this time, the plurality of viewpoints 160 and 161 may be understood as a plurality of virtual apertures that are symmetrical with the actual apertures 121 with respect to the transmissive retro-reflector 130.

That is, in the embodiment described with reference to FIG. 8, which is the fifth embodiment of the present disclosure, the pixelated optical shutter 120 may include the plurality of apertures 121 that may be opened and closed for each pixel.

When the user's eye position moves or deviates from an initially assumed eye position, light passing through any one of the plurality of apertures 121 may undergo transverse retro-reflection by the transmissive retro-reflector 130 and converge on a new or current position of the user's eye. As a result of this convergence, a new viewpoint 161 may be formed instead of an original viewpoint 160 corresponding to the initially assumed eye position, and the image or vision of the display panel 110 may be transmitted to the user's eye through the light passing through the new viewpoint 161.

As described above, by simultaneously forming the plurality of micro-openings (apertures) 121 at different positions on the pixelated optical shutter 120, it is possible to resolve the issue of the image becoming unobservable due to eye movement or differences in a distance between the eyes. In this case, in the fifth embodiment, a distance between the micro-apertures (apertures) must be appropriately adjusted, for example, to correspond to the size of the user's pupil, so that the user can observe a virtual image through only one micro-aperture (aperture). Alternatively, a distance between the micro-apertures 121 in the pixelated optical shutter 120 may correspond to a distance between the positions of the virtual viewpoints 160 and 161, which are symmetrically formed on the opposite side of the transmissive retro-reflector 130. One of the features of the present disclosure is that the micro-apertures 121 and the viewpoints 160 and 161 on both sides of the transmissive retro-reflector 130 form a symmetrical structure, and as a result, the micro-apertures 121 may be formed to match the distance between the virtual viewpoints 160 and 161, which are spaced apart based on the user's pupil size.

When the virtual viewpoints 160 and 161 are effectively arranged at intervals corresponding to the user's pupil size by adjusting the size, shape, and spacing of the micro-apertures 121, light can pass through the user's pupils and reach the user's retina regardless of the movement of the user's eyes within the arrangement range, and as a result, stable vision can be provided despite changes in the user's eye position. Expanding the range of eye position movement within the near-eye display may be referred to as the expansion of the eye-box.

To this end, any two adjacent apertures 121 among the plurality of apertures 121 may be disposed within the pixelated optical shutter 120 so that the two adjacent apertures 121 are spaced apart based on the size of the user's pupil. For example, among five apertures 121, second and third apertures from the left may be spaced apart by a distance determined based on the size of the user's pupil.

As a sixth embodiment of the present disclosure, a second proposal for expanding the eye-box is to additionally include an eye tracker 170.

Figure 9:
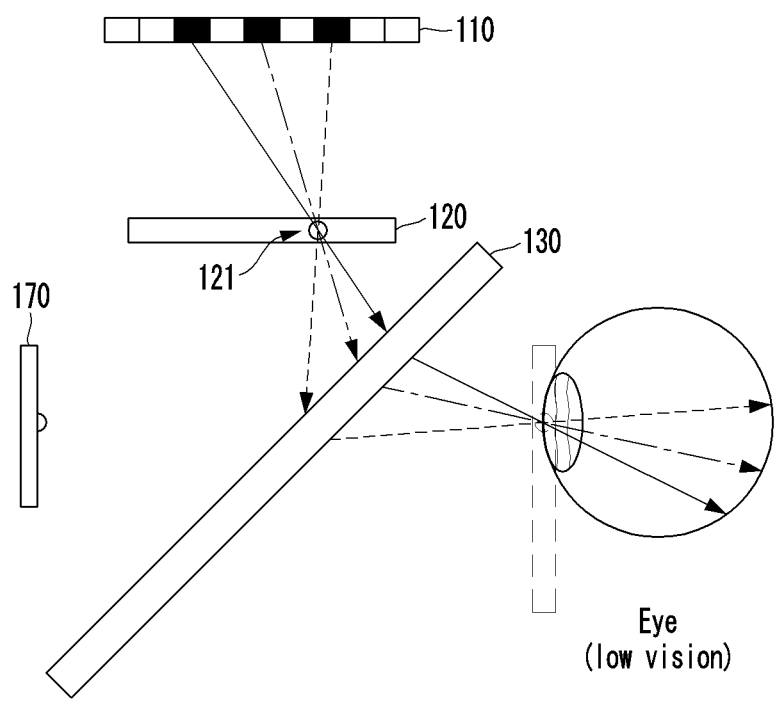
FIG. 9 illustrates a near-eye display system according to the sixth embodiment of the present disclosure.

FIG. 9 illustrates a near-eye display system according to the sixth embodiment of the present disclosure.

The sixth embodiment is an example in which the eye tracker 170 is further included in the configuration of the near-eye display system of the first embodiment.

The transmissive retro-reflector 130, such as a slit mirror array, allows a portion of the incident light to pass therethrough, and thus, the eye tracker 170 may be disposed at the front end of the slit mirror array 130. That is, the eye tracker 170 may be disposed on one of both sides of the transmissive retro-reflector 130, which is positioned on an opposite side of the user's eye.

The eye tracker 170 can track a position of the user's eye.

The processor 140 introduced in FIG. 4 may adjust a position of the apertures 121 in the pixelated optical shutter 120 based on the position of the user's eyes tracked by the eye tracker 170.

The specific method for adjusting the position of the apertures 121 may, for example, be implemented as follows. The pixelated optical shutter 120 may have a plurality of apertures formed therein as in the fifth embodiment. In this case, the processor 140 may control the pixelated optical shutter 120 to select one of the plurality of apertures 121 based on the position of the user's eye tracked by the eye tracker 170, and adjust the size of the selected aperture. For example, the pixelated optical shutter 120 may be controlled so that only a fourth aperture from the left among five apertures is opened, while the remaining apertures are closed, based on the position of the eye tracked by the eye tracker 170.

At this time, any two adjacent apertures among the plurality of apertures 121 may be spaced apart from each other based on the size of the user's pupil. This may be implemented with reference to the embodiment of FIG. 8.

Figure 10:
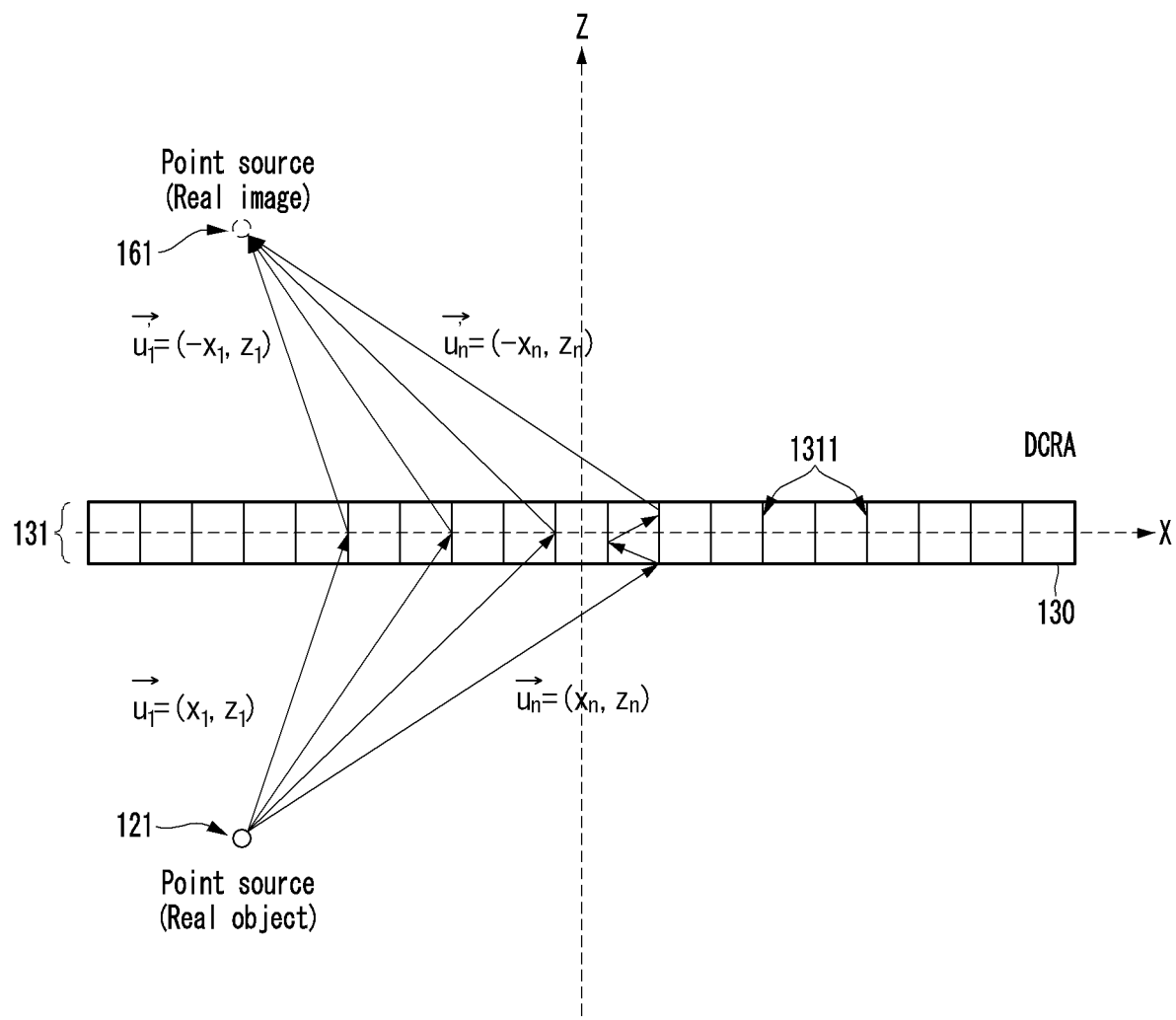
FIG. 10 is a diagram for describing the transmissive retro-reflector according to one embodiment of the present disclosure.

FIG. 10 is a diagram for describing the transmissive retro-reflector according to one embodiment of the present disclosure.

The transmissive retro-reflector 130 may include a single mirror array aligned perpendicularly to an extension direction (first direction, x-axis) of the longest edge among edges of the transmissive retro-reflector. The transmissive retro-reflector 130 can reverse the x-axis direction of incident light to generate a real image of an object in a symmetrical manner.

Alternatively, as shown in FIG. 10, the transmissive retro-reflector 130 may include two mirror arrays. For example, among the two mirror arrays, a first mirror array 131 may include a plurality of mirrors 1311, each being a mirror strip with a normal in the x-axis direction, parallel to a yz plane, and extending longitudinally in the y-axis direction. Here, a y-axis may be in a direction perpendicular to each of an x-axis and a z-axis. For example, in FIG. 10, when the x-axis and the y-axis are exchanged and described, a second mirror array (not shown) among the two mirror arrays may include a plurality of mirrors, each being a mirror strip with a normal in the y-axis direction, parallel to an xz plane, and extending longitudinally in the x-axis direction.

The transmissive retro-reflector 130 may generate a three-dimensional real image on the opposite side of a surface on which light is incident, i.e., on the plane of the eye's pupil.

At this time, as the size of the aperture 121 is adjusted, there may be a trade-off between image quality and a DoF. For example, when the aperture 121 is reduced in size, a deep DoF can be achieved, but the image quality may deteriorate due to the arrangement structure of the transmissive retro-reflector 130 (DCRA). On the other hand, when the aperture 121 is increased in size, the image quality is high, but the DoF becomes shallow, which may break the Maxwellian view effect.

When FIG. 10 is described together with the embodiments of FIGS. 4 to 9 of the present disclosure, the aperture 121 of the pixelated optical shutter 120 may be positioned at the location of the real object in FIG. 10, and the viewpoints may be positioned at the location of the real image in FIG. 10. Here, when FIGS. 4 to 10 are referred to together, the real object and the real image may be symmetrical with respect to the transmissive retro-reflector 130, and the aperture 121 and the viewpoints may also be symmetrical. In this case, the viewpoints may refer to positions formed on the surface at which the real image comes into contact with the user's eyes.

Figure 11:
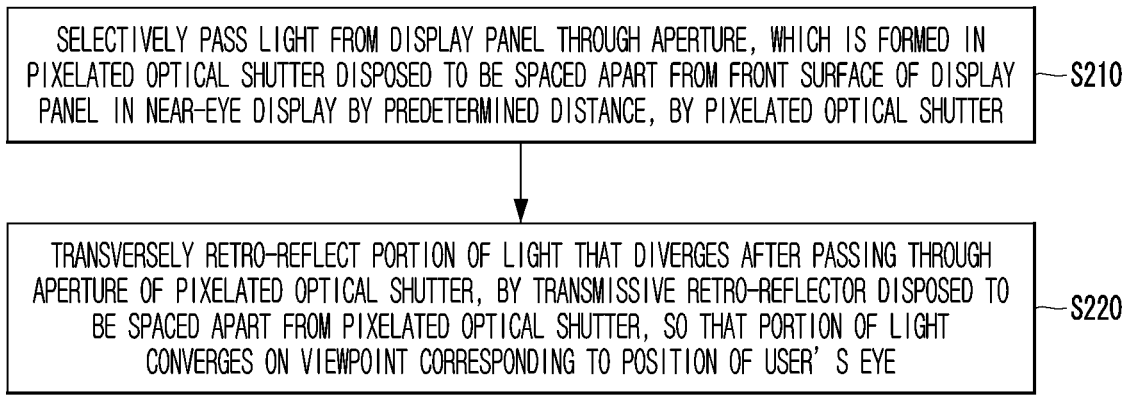
FIG. 11 is a flowchart for describing an operating method of the near-eye display according to one embodiment of the present disclosure.

FIG. 11 is a flowchart for describing an operating method of the near-eye display according to one embodiment of the present disclosure.

Hereinafter, a description will be made with reference to FIGS. 4 to 9 and FIG. 11 together.

In operation S210, the pixelated optical shutter 120, which is disposed to be spaced apart from a front surface of the display panel 110 in the near-eye display by a predetermined distance, may selectively allow light from the display panel 110 to pass through the aperture 121 formed therein.

In operation S220, the transmissive retro-reflector 130, which is disposed to be spaced apart from the pixelated optical shutter 120, may transverse retro-reflect a portion of the light that diverges after passing through the aperture 121 of the pixelated optical shutter 120, so that the portion of the light converges on a viewpoint corresponding to a position the user's eye. In this case, the transverse retro-reflection in operation S220 may form a light path so that the aperture 121 of the pixelated optical shutter 120 and the viewpoint, at which the transversely retro-reflected light converges on the position of the user's eye, are symmetrical with respect to the transmissive retro-reflector 130.

At this time, the aperture 121 of the pixelated optical shutter 120 may be a micro-aperture, and the size and shape of the aperture 121 may be preset based on a depth of field (DoF) of the near-eye display.

In this case, operation S210 of selectively passing light from the display panel 110 through the aperture 121 formed in the pixelated optical shutter 120 by the pixelated optical shutter 120 may be an operation of opening or closing the aperture 121 on a pixel-by-pixel basis to block or transmit light for each pixel.

The method may further include an operation (not shown) of collimating light emitted from each pixel of the display panel 110 by the collimation lens 150 disposed between the display panel 110 and the pixelated optical shutter 120.

At this time, the eye tracker 170, which is disposed on one of both sides of the transmissive retro-reflector 130, which is positioned on an opposite side of the user's eye, may track the position of the user's eye.

In this case, the processor 140 may adjust the position of the apertures 121 in the pixelated optical shutter 120 based on the position of the user's eye tracked by the eye tracker 170.

In the present disclosure, image deterioration caused by the DCRA structure can be reduced by changing the shape of the aperture 121. This enables the trade-off between the image quality and the DoF, which is determined by the size of the aperture 121, to be alleviated.

According to the present disclosure, full-focus imaging is enabled by restricting the aperture size in the pixelated optical shutter 120. Further, according to the present disclosure, the transmissive retro-reflector 130 can provide the user with a virtual viewpoint by creating a real image through a virtual pinhole of the pixelated optical shutter 120 at the pupil plane of the eye.

According to the present disclosure, a near-eye display system can be provided that allows the user to observe always-focused images regardless of the focal power of the eye's lens.

According to the present disclosure, the deepened DoF achieved through the micro-aperture provides always-focused images regardless of user's eye focus information, which indicates that depth information of objects observable with one eye has disappeared. Accordingly, the eye fatigue caused by a difference between monocular depth information and binocular depth information, which is a problem in conventional near-eye displays, can also be alleviated, making it possible to wear the system for long periods of time.

Figure 12:
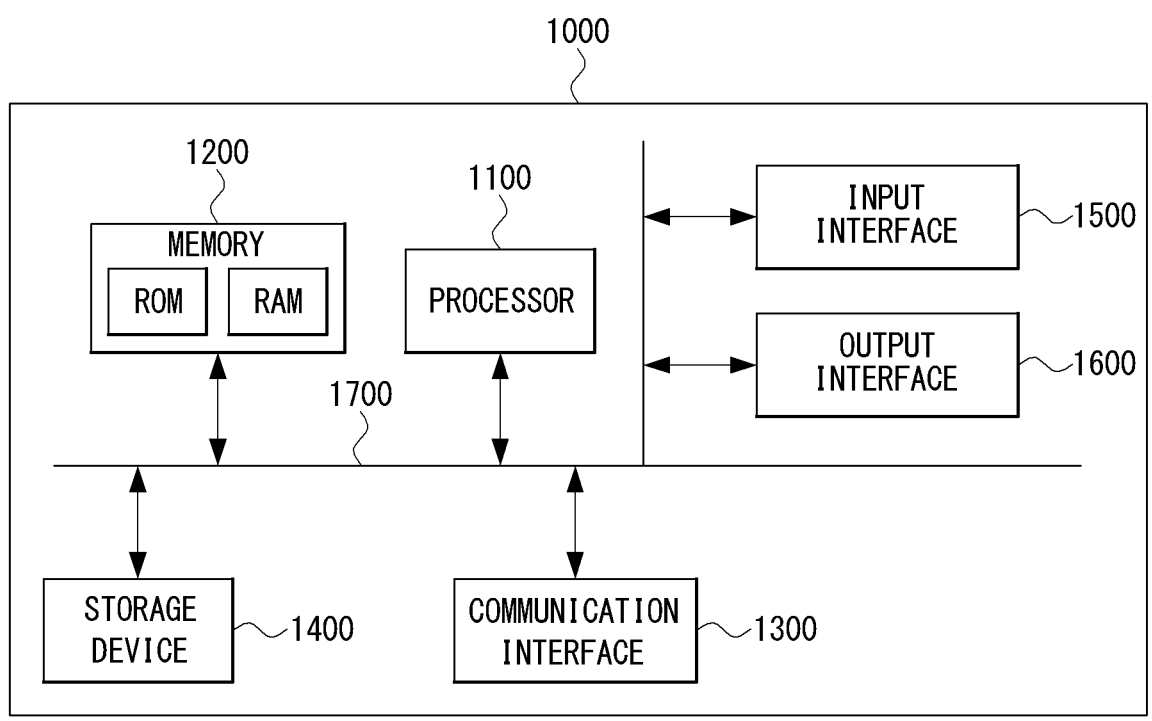
FIG. 12 is a conceptual diagram illustrating an example of a generalized near-eye display system or computing system capable of performing at least some of the processes shown in FIGS. 1 to 11.

FIG. 12 is a conceptual diagram illustrating an example of a generalized near-eye display system or computing system capable of performing at least some of the processes shown in FIGS. 1 to 11.

At least some of the processes of the operating method of the near-eye display according to one embodiment of the present disclosure may be executed by a computing system 1000 of FIG. 12.

Referring to FIG. 12, the computing system 1000 according to one embodiment of the present disclosure may include a processor 1100, a memory 1200, a communication interface 1300, a storage device 1400, an input interface 1500, an output interface 1600, and a bus 1700.

The computing system 1000 according to one embodiment of the present disclosure may include at least one processor 1100 and the memory 1200 that stores instructions directing the at least one processor 1100 to perform at least one operation. At least some operations of the method according to one embodiment of the present disclosure may be performed by the at least one processor 1100 by loading and executing instructions from the memory 1200.

The processor 1100 may refer to a central processing unit (CPU), a graphics processing unit (GPU), or a dedicated processor for performing methods according to embodiments of the present disclosure.

The memory 1200 and the storage device 1400 may each be configured as at least one of a volatile storage medium and a non-volatile storage medium. For example, the memory 1200 may be configured as at least one of a read-only memory (ROM) and a random access memory (RAM).

Further, the computing system 1000 may include the communication interface 1300 that performs communication via a wireless network.

Further, the computing system 1000 may further include the storage device 1400, the input interface 1500, the output interface 1600, and the like.

Further, each of the components included in the computing system 1000 may communicate with each other by being connected by the bus 1700.

Examples of the computing system 1000 of the present disclosure may include a communicable desktop computer, a laptop computer, a notebook computer, a smartphone, a tablet personal computer (PC), a mobile phone, a smart watch, smart glasses, an e-book reader, a portable multimedia player (PMP), a portable gaming device, a navigation device, a digital camera, a digital multimedia broadcasting (DMB) player, a digital audio recorder, a digital audio player, a digital video recorder, a digital video player, a personal digital assistant (PDA), and the like.

The operations of the method according to the exemplary embodiment of the present disclosure can be implemented as a computer readable program or code in a computer readable recording medium. The computer readable recording medium may include all kinds of recording apparatus for storing data which can be read by a computer system. Furthermore, the computer readable recording medium may store and execute programs or codes which can be distributed in computer systems connected through a network and read through computers in a distributed manner.

The computer readable recording medium may include a hardware apparatus which is specifically configured to store and execute a program command, such as a ROM, RAM or flash memory. The program command may include not only machine language codes created by a compiler, but also high-level language codes which can be executed by a computer using an interpreter.

Although some aspects of the present disclosure have been described in the context of the apparatus, the aspects may indicate the corresponding descriptions according to the method, and the blocks or apparatus may correspond to the steps of the method or the features of the steps. Similarly, the aspects described in the context of the method may be expressed as the features of the corresponding blocks or items or the corresponding apparatus. Some or all of the steps of the method may be executed by (or using) a hardware apparatus such as a microprocessor, a programmable computer or an electronic circuit. In some embodiments, one or more of the most important steps of the method may be executed by such an apparatus.

In some exemplary embodiments, a programmable logic device such as a field-programmable gate array may be used to perform some or all of functions of the methods described herein. In some exemplary embodiments, the field-programmable gate array may be operated with a microprocessor to perform one of the methods described herein. In general, the methods are preferably performed by a certain hardware device.

The description of the disclosure is merely exemplary in nature and, thus, variations that do not depart from the substance of the disclosure are intended to be within the scope of the disclosure. Such variations are not to be regarded as a departure from the spirit and scope of the disclosure. Thus, it will be understood by those of ordinary skill in the art that various changes in form and details may be made without departing from the spirit and scope as defined by the following claims.

What is claimed is:

1. A near-eye display system comprising:
   a display panel;
   a pixelated optical shutter disposed to be spaced apart from a front surface of the display panel by a predetermined distance, and configured to selectively pass light from the display panel through an aperture formed therein; and
   a transmissive retro-reflector configured to transversely retro-reflect a portion of the light diverging after passing through the aperture of the pixelated optical shutter so that the portion of the light converges on a viewpoint of a position of a user's eye,
   wherein the aperture of the pixelated optical shutter and the viewpoint in which the transversely retro-reflected light converges on the position of the user's eye form a symmetry with respect to the transmissive retro-reflector.

2. The near-eye display system of claim 1, wherein
   the aperture of the pixelated optical shutter is a micro-aperture,
   the pixelated optical shutter opens or closes the aperture for each pixel to block or pass light for each pixel, and
   a size and a shape of the aperture are predetermined based on a depth of field (DoF) of the near-eye display system.

3. The near-eye display system of claim 1, further comprising a collimation lens disposed between the display panel and the pixelated optical shutter and configured to collimate light emitted from each pixel of the display panel.

4. The near-eye display system of claim 1, further comprising an eye tracker disposed on one of both sides of the transmissive retro-reflector, which is positioned on an opposite side of the user's eye and configured to track the position of the user's eye.

5. The near-eye display system of claim 4, further comprising a processor,
   wherein the processor adjusts a position of the aperture of the pixelated optical shutter based on the position of the user's eye tracked by the eye tracker.

6. The near-eye display system of claim 4, further comprising a processor,
wherein the pixelated optical shutter includes a plurality of apertures that are opened and closed for each pixel, and
the processor selects one of the plurality of apertures based on the position of the user's eye tracked by the eye tracker and controls the pixelated optical shutter so that light passing through the selected aperture is incident on the transmissive retro-reflector.

7. The near-eye display system of claim 1, wherein
the pixelated optical shutter includes a plurality of apertures that are opened and closed for each pixel, and
when the position of the user's eye moves, light passing through one of the plurality of apertures is transversely retro-reflected by the transmissive retro-reflector and converges on a new position of the user's eye to form a new viewpoint.

8. The near-eye display system of claim 7, wherein
two adjacent apertures among the plurality of apertures in the pixelated optical shutter are spaced apart based on a size of a user's pupil, and
as the user's eye moves, the light transversely retro-reflected by the transmissive retro-reflector continuously converges on the user's eye to provide a visual corresponding to the display panel.

9. The near-eye display system of claim 1, wherein the transmissive retro-reflector includes at least one mirror array aligned perpendicular to a first direction.

10. The near-eye display system of claim 1, wherein the transmissive retro-reflector includes mirrors arranged such that incident light is diagonally orthogonal.

11. The near-eye display system of claim 1, wherein a distance between the display panel and the pixelated optical shutter is determined based on a size of the display panel and a predetermined field of view (FoV).

12. The near-eye display system of claim 1, wherein the pixelated optical shutter includes at least one polarizer and a transmissive panel coupled to the at least one polarizer.

13. The near-eye display system of claim 1, wherein the transmissive retro-reflector is one of a dihedral corner reflector array (DCRA) and a slit mirror array.

14. An operating method of a near-eye display, comprising
selectively passing light from a display panel through an aperture, which is formed in a pixelated optical shutter disposed to be spaced apart from a front surface of the display panel in the near-eye display by a predetermined distance, by the pixelated optical shutter; and
transversely retro-reflecting a portion of the light that diverges after passing through the aperture of the pixelated optical shutter, by a transmissive retro-reflector disposed to be spaced apart from the pixelated optical shutter, so that the portion of the light converges on a viewpoint of a position of a user's eye,
wherein in the transversely retro-reflecting, a path of the light is formed so that the aperture of the pixelated optical shutter and the viewpoint in which the transversely retro-reflected light converges on the position of the user's eye form a symmetry with respect to the transmissive retro-reflector.

15. The operating method of claim 14, wherein
the aperture of the pixelated optical shutter is a micro-aperture,
a size and a shape of the aperture are predetermined based on a depth of field (DoF) of the near-eye display, and
in the selectively passing of the light from the display panel through the aperture, which is formed in the pixelated optical shutter, by the pixelated optical shutter, the aperture opens or closes for each pixel to block or pass light for each pixel.

16. The operating method of claim 14, further comprising collimating light emitted from each pixel of the display panel using a collimation lens disposed between the display panel and the pixelated optical shutter.

17. The operating method of claim 14, further comprising tracking the position of the user's eye by an eye tracker disposed on one of both sides of the transmissive retro-reflector, which is positioned on an opposite side of the user's eye.

18. The operating method of claim 17, further comprising adjusting a position of the aperture of the pixelated optical shutter based on the position of the user's eye tracked by the eye tracker.

* * * * *